June 2, 1964  J. T. MAYNARD  3,135,885
DYNAMOELECTRIC MACHINES
Filed March 26, 1959
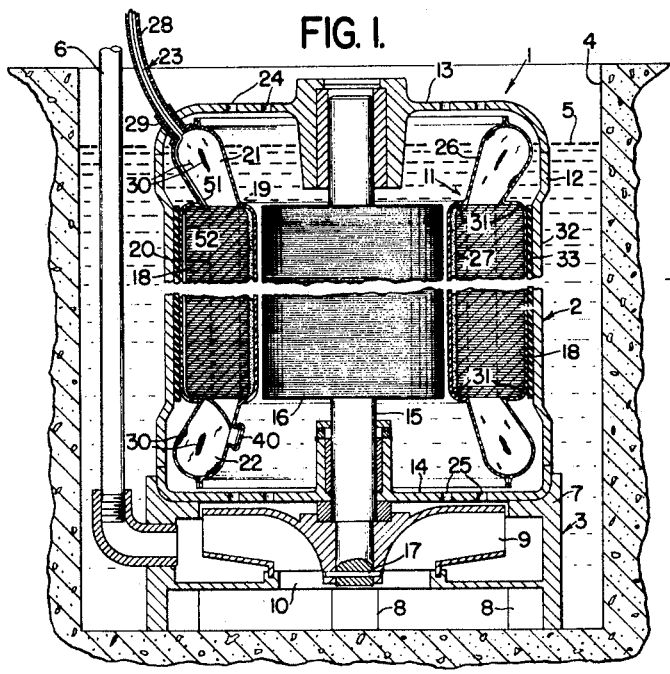
FIG. 1.
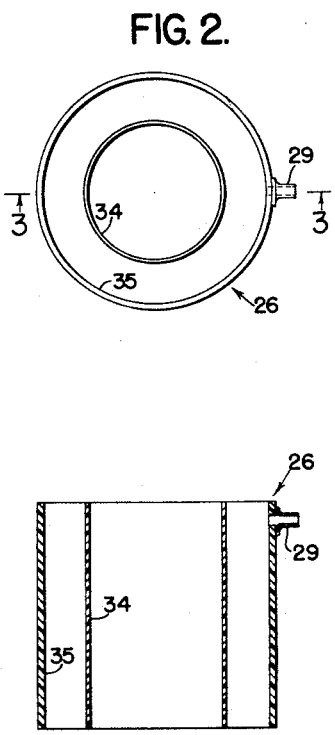
FIG. 2.
FIG. 3.
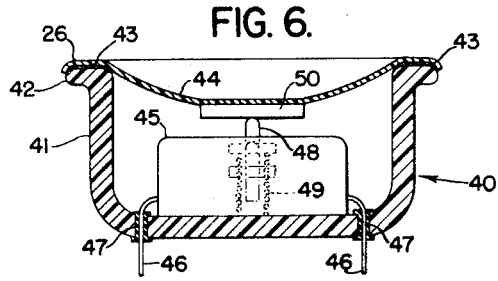
FIG. 6.
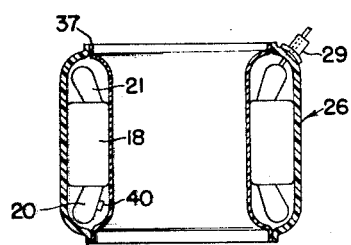
FIG. 4.
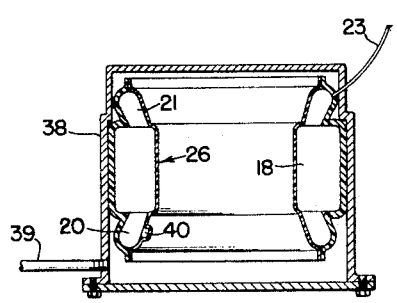
FIG. 5.
INVENTOR.
JOHN T. MAYNARD
BY
Andrus & Starke
Attorneys

United States Patent Office 3,135,885
Patented June 2, 1964

3,135,885
DYNAMOELECTRIC MACHINES
John T. Maynard, West Allis, Wis., assignor to A. O. Smith Corporation, Milwaukee, Wis., a corporation of New York
Filed Mar. 26, 1959, Ser. No. 802,234
10 Claims. (Cl. 310—87)

This invention relates to dynamoelectric machines having a hermetically enclosed power winding and is particularly directed to an improved apparatus and method for hermetically enclosing the power winding.

In submersible dynamoelectric machines, such as submersible well motors, sump pumps and the like, the multi-turn stator or field winding must be protected from the submerging liquid. The winding is wound of wire which has a relatively thin insulation to prevent shorting between the turns. If liquid or the like reaches the stator winding, the thin insulation is destroyed and a short circuit established which destroys the winding.

Conventionally, the stator unit of a submersible motor is sealed against leakage within a metallic double-wall tubular housing which is filled with a suitable heat transfer material to dissipate the heat generated by current flow in the winding. The stator may also be imbedded directly in a plastic mass serving as the housing for the stator assembly.

A metal housing for a stator necessarily has a thin inner wall covering the stator surface adjacent the rotor to establish minimum spacing of the stator core from the rotor core and maximum electromagnetic coupling. The inner wall normally is formed of a foil-like stainless steel or the like which is welded or brazed to the end walls of the housing. The foil-like wall is not self-supporting and a suitable backing material is provided to support the wall. In some instances, the thin wall portion is actually bonded to the backing material and to the adjacent stator core.

In submersible motors and similar intermittently operated devices, it is difficult to adequately secure the foil-like wall and to prevent breakdown during operation. Thus, the intermittent motor operation establishes continuous heating and cooling of the wall. As the rate of expansion and contraction of suitable liner materials is quite large, the wall expands and contracts and may bulge outwardly into engagement with the rotor. The rotor rapidly wears through the thin wall and admits the surrounding fluid into the stator housing.

Further, a releasable plug connection is normally provided into the stator section to releasably connect the stator winding to incoming power leads. An adequate and inexpensive seal adjacent the opening is required to prevent the entrance of fluid into the stator housing.

A plastic cast stator unit generally tends to absorb fluid in some degree and eventually the stator winding is shorted by the absorbed fluid. The life of the stator is relatively short particularly in deep well submersible motors and the like where removal of the machine is expensive and troublesome.

The present invention is directed to provision of a simple and inexpensive hermetic enclosure for the power winding of a dynamoelectric machine.

In accordance with the present invention, the power winding unit is enveloped in a sheet of plastic which is impervious to the submerging fluid. The plastic sheet is hermetically sealed upon itself and the power leads to hermetically enclose the power winding unit.

In accordance with another aspect of the invention, the stator is disposed within a bag generally conforming to the configuration of the stator assembly. A suitable resin is disposed within the bag to completely fill all voids within the stator assembly. The bag is then forced into intimate contact with the adjacent surfaces of the resin-filled stator. The resin is preferably solidified to support the plastic enveloping bag.

In accordance with still another aspect of the present invention as applied to sump pumps and the like which operate in response to the level of a submerging liquid, a pressure switch is supported within the plastic bag and suitably connected in circuit with the stator winding. A portion of the bag covers a switch actuating member and constitutes a diaphragm which moves in response to changes in the fluid level and actuates the switch to automatically start and stop the motor.

The drawing furnished herewith illustrates the best mode presently contemplated for carrying out the invention.

In the drawing:

FIGURE 1 is a vertical section through a sump pump constructed in accordance with the present invention;

FIGURE 2 is a top plan view of a plastic bag prior to assembly with the stator unit;

FIGURE 3 is a sectional view taken on line 3—3 of FIGURE 2;

FIGURE 4 is a view similar to FIGURE 3 with a stator unit mounted within the plastic bag;

FIGURE 5 is a view of the plastic bag collapsed about a stator unit prior to assembly of the stator in the motor; and FIGURE 6 is an enlarged view of the automatic on-off switch construction employed in the embodiment shown in FIGURE 1.

Referring to the drawing and particularly to FIGURE 1, a sump pump 1 comprising a motor 2 and a lower pump assembly 3 is shown supported within a conventional sump 4 in a basement or other similar structure. The sump 4 is located to accumulate water 5 which slowly rises about the sump pump 1. A discharge conduit 6 is disconnected to the pump assembly 3 and extended upwardly into any suitable discharged location, not shown. The sump pump 1 is automatically actuated to pump the fluid from the sump 4 through the discharge conduit 6 incident to a predetermined rise or level of the water 5 within the sump 4.

The lower pump assembly 3 includes an outer cast housing 7 having suitable depending legs 8 to support the sump pump 1 in spaced relation to the bottom of sump 4. A rotary pump impeller 9 is rotatably mounted within the housing 7 adjacent an inlet opening 10 formed in the bottom wall of the housing 7. The rotary impeller 9 draws the water 5 in through the inlet 10 and discharges the incoming water through the discharge conduit 6. The rotary impeller 9 is driven by the electric motor 2 in response to the level of the water 5 in the sump 4.

The motor 2 includes an annular stator 11 which is supported within a tubular outer shell 12 having upper and lower end bells 13 and 14. A rotor shaft 15 is journaled concentrically within the upper and lower end bells 13 and 14 and rotatably supports a squirrel-cage rotor 16 in alignment with the annular stator 11. Energizing of the stator 11 establishes an electromagnetic action between the stator 11 and the rotor 16 which causes the rotor 16 and the attached shaft 15 to rotate.

The pump impeller 9 is secured to the lower end of the rotor shaft 15 as by a cross pin 17 and pumps the water 5 from the sump 4 incident to energization of the stator 11.

The annular stator 11 includes an annular core 18 which is rigidly mounted within the stator shell 12. A multiturn field winding 19 is wound within axial slots 20 formed in the bore of the core 18. The field winding 19 projects upwardly and downwardly from the end faces of core 18, as at 21 and 22, to connect the wires within the slots.

A power cable 23 is connected to the winding 19 and extends outwardly of the motor 2 to an incoming power line, not shown.

The end bells 13 and 14 of the motor 2 are apertured as at 24 and 25 to allow free flow of water 5 into and from the motor housing or shell 12. Consequently, as the water 5 rises in sump 4, the stator 11 and rotor 16 are immersed in the water.

The rotor 16 is not affected by the water. However, the field winding 19 must be protected from the water 5 in order to prevent short circuiting of the winding 19. Thus, if the water 5 contacts the winding 19, a low resistance path directly to ground is established. Consequently, large current flow results and rapidly burns out the winding or a protective fuse, not shown.

In accordance with the present invention, a thermoplastic membrane or envelope 26 of a suitable preformed sheet thermoplastic, such as vinyl or other essentially water imprevious plastic, completely encases the field winding 19 and stator core 18. Although a plastic envelope 26 such as vinyl may very slowly absorb fluid, the rate is generally at a much slower rate than sprayed and cast coatings and for practical commercial practice may be considered impervious to fluid.

The envelope 26 may be made very thin and consequently establish excellent cooling of the stator winding 10 by the water 5 which rises within the motor and immerses the stator of the submersible motor during a cycle of operation. The motor can therefore be reduced in size.

The plastic envelope 26 is electrically non-conductive and consequently no eddy currents can be established as in stainless steel lined stator units. Eddy currents constitute wasted energy and consequently the present invention provides a more efficient motor.

An adhesive 27 is disposed between the bore of the stator core 18 and the adjacent envelope 26 to positively bond the envelope to the core and prevent possible movement of the envelope into engagement with the rotor 16. The thickness of adhesive 27 is shown substantially enlarged for purposes of clarity of illustration.

The power cable 23 includes an outer electrically insulating sheath 28 and projects through an opening in the envelope 26 to allow connection of winding 19 to a source of power, not shown. A plastic sleeve 29 is sealed to the envelope 26 about the cable 23 and to the insulating sheath 28 to prevent liquid leakage therethrough. Thus, where a vinyl plastic is employed for envelope 26, the sheath 28 and sleeve 29 may also be a vinyl and readily sealed to each to hermetically close the lead-in opening.

A suitable resin 30 fills the voids, shown substantially enlarged, within the stator winding 19 to rapidly dissipate the heat generated by current flow in winding 19 and prevent establishment of hot spots within the winding. The plastic resin 30 preferably sets up as a solid mass to provide a backing to the adjacent envelope.

The resin 30 may take the from of a pure plastic or, to reduce the cost, may comprise a mixture of a suitable plastic and an inert material such as quartz sand.

The several end edges of the stator core 18 are rounded as at 31 to reduce the danger of puncturing the envelope 26 during application of the envelope and more particularly during the subsequent handling and assemblying of the enclosed stator into the frame 12.

The frame 12 is crimped about the stator core 18 as at 32 to securely clamp the stator 13 in operating position. A rubber sleeve 33 encircles the outer surface of the envelope 26 coextensively of the stator core 18 and establishes a cushion between frame 12 and core 18. The rubber sleeve 33 thus prevents creation of load concentrations upon the envelope which would tend to break the envelope.

A particularly simple and inexpensive method of applying the envelope 26 to the stator 11 is shown in FIGS. 2-5 and described as follows.

Referring particularly to FIGS. 2 and 3, plastic envelope 26 is formed of a pair of concentric sleeves 34 and 35 having diameters respectively slightly less than the inner and outer diameters of core 18. The power lead opening for power cable 23 is provided in the upper portion of the outer sleeve 35 and the cable sleeve 29 is secured to the outer sleeve 35 and is subsequently sealed to the insulating sheath 28 of cable 23 to seal the opening. The adhesive 27 is carried by the inner sleeve 34.

The stator core 18 and assembled winding 19 are disposed between the sleeves 34 and 35 with cable 23 projecting outwardly through the sleeve 29.

The lower edges of the adjacent sleeves 34 and 35 are placed together and hermetically sealed to form a hermetically closed seam 36 and to form a bag like structure, as shown in FIGURE 4. The filler resin 30 is inserted within the sealed sleeves 34 and 35 and the upper edges of the sleeves are similarly sealed as at 37. The assembly is disposed within a suitable pressure chamber 38 having an incoming pressure line 39. Pressure is applied to collapse the envelope 26 into intimate contact with the adjacent surfaces of the stator core 18 and winding 19 and to force any excess resin 30 from the bag through the cable sleeve 29. The inner sleeve 34 expands slightly to remove all wrinkles adjacent the bore of the stator. The adhesive 27 positively holds the thin inner sleeve in place.

The cable sleeve 29 is hermetically sealed to the adjacent power cable 23 to hermetically encase stator within the envelope 26.

The hermetically sealed stator 11 is then mounted within the motor shell 12 and the end shells 13 and 14 secured in position.

The illustrated outer sleeve 35 is slightly thicker than the inner sleeve 34 to more fully protect the outer surfaces of core 18 and winding 19 during the handling and assembling of the stator until 11. The outer sleeve 35 of envelope 26 does not affect the electrical characteristic of the motor and need not be maintained as thin as does the inner sleeve 34.

The envelope 26 provides a relatively inexpensive and rapid method of hermetically enclosing the stator. As the plastic envelope 26 may be made extremely thin and is non-magnetic, minimum interference with magnetic coupling between the stator 11 and the rotor 16 results.

In the illustrated embodiment of the invention, an on-off switch assembly 40 is connected in circuit with field winding 19 and disposed within the plastic envelope 26 of the stator unit 11.

Referring particularly to FIGURE 6, the switch assembly 40 includes a rigid cup-shaped housing 41 of suitable electrically insulating material. A flange 42 is integrally formed on the open edge of the cup-shaped housing 41. The switch assembly 40 is mounted within the envelope 26 with the flange 42 engaging and being adhesively bonded to the plastic envelope 26 as by a suitable adhesive 43. The overlying plastic envelope 44 is flexible and adapted to move into and out of housing 41.

A switch 45 is secured within the housing 41 and includes a pair of leads 46 which extend outwardly of the housing 41 and into suitable circuit connection with the stator winding 19 to selectively open and complete the energizing circuit to the stator winding. A suitable sealant 47 seals the openings in housing 35 adjacent the leads 46.

The switch 45 includes a switch actuating plunger rod 48 which projects toward the overlying plastic envelope 44. A spring 49 biases the rod 48 outwardly of the housing 41 and into engagement with the overlying plastic envelope 44. A rigid bearing disk 50 is cemented to the overlying envelope 44 in alignment with the switch rod 48 and transmits movement of the overlying plastic envelope 44 to the rod.

The switch 45 is a pressure differential type switch such that after initial closing of the switch 45 by inward movement of the rod 48 to the full line position shown in FIGURE 6, the pressure may decrease and the rod 48 move outwardly a predetermined amount before the switch opens and stops the motor 2. The switch 45 is normally set to allow complete discharge of the water 5 from the sump 4 before the motor stops and returns to standby position.

The plastic bag 26 serves to actuate and protect the starting switch 45. The connecting leads 46 are relatively short and further reduce the cost of the motor 2.

In capacitor start motors, the capacitor, not shown, may also be disposed within the plastic bag 26 and connected in circuit with switch 39 and the field winding 19.

A small vent tube 51 is secured within the wall of the switch housing 41 and extends outwardly through the power cable 23 to maintain a constant pressure within switch housing 41. This prevents changes in the operating pressure of the switch 45 incident to heating and cooling of the atmosphere within the switch housing 41.

An axial groove 52 is provided in the outer circumference of the stator core 18 to accommodate the vent tube between the switch assembly 40 and the power cable 23. The groove 52 may be specially formed in the outer circumference of the stator 18. Where a stator core includes certain slots or grooves as for welding or cooling, the vent tube may be readily passed therethrough without the necessity of a special groove.

The illustrated embodiment of the invention functions in the following manner.

The sump pump 1 is disposed within the sump 4 with the conduit 6 connected to a suitable overflow or discharge means, not shown. The accumulating water 5 rises within the sump 4 and enters the motor 2 through the pump assembly 3 and the apertures 25 in the lower end bell 14.

As the water 5 rises in sump 4, the water pressure increases and forces the switch portion 44 of the envelope 26 inwardly of the switch housing 41. At a determined water level, the water pressure overcomes the force of the switch spring 49 and forces the switch rod 48 into the actuted position, shown in phantom in FIG. 6. The circuit to the stator winding 19 is then completed and the winding is energized to operate the motor 2.

Operation of motor 2 rapidly rotates the pump impeller 9 which pumps the water 5 from the sump 4 outwardly through the discharge conduit 6. The motor 2 continues to operate until the water 5 is completely discharged, at which time the water pressure has decreased to the level at which switch 45 opens to stop the motor 2.

The plastic membrane of the present invention provides a simple and effective enclosure for hermetically enclosing the stator winding of a motor or the like. A very thin membrane may be used in order to provide rapid heat dissipation from winding 19 and to establish a minimum air gap between the rotor and the stator.

Various modes of carrying out the invention are contemplated as being within the scope of the following claims particularly pointing out and distinctly claiming the subject matter which is regarded as the invention.

I claim:
1. In a dynamoelectric machine, a stator section having an annular laminated core carrying a multi-turn field winding, said core having rounded end edges, a performed plastic membrane secured in intimate contact with the stator section to hermetically enclose the stator section, a resilient sleeve encircling the laminated core and membrane, and a frame having a tubular portion clamped about the core to support the stator section.

2. In a dynamoelectric machine, a stator section having an annular laminated core carrying a multi-turn field winding, said core having rounded end edges, a preformed plastic membrane secured in intimate contact with the stator section to hermetically enclose the stator section, and means to bond the adjacent surfaces of the stator bore and the membrane to prevent movement of the membrane.

3. In a dynamoelectric machine, a stator section having an annular laminated core carrying a multi-turn field winding, said core having rounded end edges, a preformed plastic membrane secured in intimate contact with the stator section to hermetically enclose the stator section, and an adhesive interposed between the bore of the stator and the adjacent membrane to securely bond the membrane in place.

4. An annular stator having an annular core and a winding for a dynamoelectric machine, which comprises a thin tubular plastic member secured within the bore of the stator section, a second tubular plastic member thicker than said first tubular member secured about the outer circumference of the stator section, means sealing the adjacent edges of said sleeves to form a hermetically enclosing envelope about said stator, a power cable connected to said winding and projecting outwardly through said envelope, and means to seal the envelope to the power cable to maintain said hermetic enclosure of said stator.

5. In a submersible motor adapted to be automatically energized in response to the submerging fluid, a plastic membrane, a stator hermetically enclosed in the plastic membrane, and a switch disposed within said plastic membrane and having a switch element adjacent the plastic membrane, said plastic membrane being flexible for movement with said switch element to serve as a fluid pressure-responsive switch diaphragm to actuate said switch.

6. In a submersible motor having openings to admit submerging fluid into the motor and having an annular stator, an annular tubular plastic envelope enclosing said stator, said plastic envelope being disposed in intimate contact with the adjacent stator surfaces, a switch connected in circuit with said stator and mounted within said bag, said switch having an opening facing the adjacent surface of the plastic envelope with the overlying plastic envelope being adapted to move into the opening, and a switch element disposed in the path of said overlying envelope and actuated incident to predetermined movement of the overlying envelope.

7. A submersible motor having a stator section mounted within a housing admitting the submerging fluid, which comprises a switch housing having an opening, a switch means mounted within the housing and having a movable member aligned with said opening, a plastic membrane enveloping said stator section and said switch housing to hermetically enclose the stator section and the switch housing with the housing opening adjacent the membrane, and a rigid bearing member secured to the membrane and aligned with said switch element to establish actuation of the switch means incident to preselected submerging fluid pressure.

8. A submersible motor having a stator section mounted within a housing having openings to admit flow of the submerging fluid, a cup-shaped housing having a flange on the outer edge, a switch means secured to the base of the housing and having a switch rod biased outwardly, said switch means being connected in circuit with the motor, a preformed plastic membrane tightly enveloping said stator section and said housing, and means hermetically sealing the adjacent surface of the bag to said flange to constitute a pressure responsive diaphragm.

9. In a sump pump having a rotary driven pump section adapted to be disposed in the base of a sump, a drive motor for the pump section comprising, an electric motor housing for mounting upon said pump section and having openings for admitting the submerging liquid as it rises about the pump section, an annular stator having an annular core secured within said housing and field windings wound in slots on the inner core bore and extending axially of the core, the extended portion of the winding being forced radially outwardly, a pressure-differential starting switch connected in circuit with said field windings and having a plunger switch arm, a cup-shaped housing for said switch with the plunger aligned with the housing opening, a thermoplastic enclosure collapsed about the annular stator and the switch housing to mount the starting switch and to hermetically enclose the switch and the stator, a bearing member being interposed between the plastic bag and the plunger to move said plunger incident to changes in the pressure of the submerging liquid, and a cured thermosetting resin filling the voids in the field winding to eliminate hot spots and to support the plastic bag.

10. In a dynamoelectric machine, a stator section having an annular laminated core carrying a multi-turn field winding, a preformed plastic membrane of a substantially uniform thickness having a hermetically sealed seam to hermetically and completely enclose the stator section, and means securing the membrane in intimate contact with all exterior surfaces of the stator section.

References Cited in the file of this patent

UNITED STATES PATENTS

| | | |
|---|---|---|
| 1,261,193 | Van Deventer | Apr. 2, 1918 |
| 1,883,736 | Cotterman | Oct. 18, 1932 |
| 2,104,189 | Cotterman | Jan. 4, 1938 |
| 2,611,930 | Hill et al. | Sept. 30, 1952 |
| 2,744,204 | McGuiness | May 1, 1956 |
| 2,761,985 | Schaefer | Sept. 4, 1956 |
| 2,829,288 | Schaefer | Apr. 1, 1958 |
| 2,852,470 | Henne et al. | Sept. 16, 1958 |
| 2,887,062 | Cametti et al. | May 19, 1959 |
| 2,945,173 | Lemmerman et al. | July 12, 1960 |
| 3,041,976 | Maynard | July 3, 1962 |

FOREIGN PATENTS

| | | |
|---|---|---|
| 1,148,642 | France | June 24, 1957 |
| 778,159 | Great Britain | July 3, 1957 |

UNITED STATES PATENT OFFICE
CERTIFICATE OF CORRECTION

Patent No. 3,135,885

June 2, 1964

John T. Maynard

It is hereby certified that error appears in the above numbered patent requiring correction and that the said Letters Patent should read as corrected below.

Column 3, line 59, for "from" read -- form --; column 4, line 38, for "until" read -- unit --; column 5, line 41, for "actuted" read -- actuated --; line 63, for "performed" read -- preformed --.

Signed and sealed this 27th day of October 1964.

(SEAL)
Attest:

ERNEST W. SWIDER
Attesting Officer

EDWARD J. BRENNER
Commissioner of Patents